United States Patent
Saunders, IV et al.

(10) Patent No.: US 10,132,559 B2
(45) Date of Patent: Nov. 20, 2018

(54) FIELD DATA SENSOR AND METHOD OF REMOTE PERFORMANCE MONITORING

(71) Applicant: Carleton Saunders, IV, Mendham, NJ (US)

(72) Inventors: Carleton Saunders, IV, Mendham, NJ (US); Tom O'Neil, Nashville, TN (US)

( * ) Notice: Subject to any disclaimer, the term of this patent is extended or adjusted under 35 U.S.C. 154(b) by 222 days.

(21) Appl. No.: 14/882,503

(22) Filed: Oct. 14, 2015

(65) Prior Publication Data
US 2016/0040925 A1 Feb. 11, 2016

Related U.S. Application Data

(63) Continuation-in-part of application No. 13/847,484, filed on Mar. 20, 2013, now Pat. No. 9,261,313.

(60) Provisional application No. 62/111,843, filed on Feb. 4, 2015.

(51) Int. Cl.
| | |
|---|---|
| *F25D 29/00* | (2006.01) |
| *F28F 27/00* | (2006.01) |
| *G01K 13/00* | (2006.01) |
| *F25B 49/00* | (2006.01) |
| *G01K 7/42* | (2006.01) |
| *F25B 49/02* | (2006.01) |

(52) U.S. Cl.
CPC ......... *F25D 29/005* (2013.01); *F25B 49/005* (2013.01); *F28F 27/00* (2013.01); *G01K 7/427* (2013.01); *G01K 13/00* (2013.01); *F25B 49/02* (2013.01); *F25B 2700/2104* (2013.01); *F25D 2700/12* (2013.01); *G01K 2207/04* (2013.01); *Y10T 29/4935* (2015.01)

(58) Field of Classification Search
CPC ... F25D 29/005; F25D 2700/12; G01K 7/427; G01K 13/00; G01K 2207/04; F25B 49/005; F25B 49/02; F25B 2700/2104; F28F 27/00; Y10T 29/4935
See application file for complete search history.

(56) References Cited

U.S. PATENT DOCUMENTS

| | | | | |
|---|---|---|---|---|
| 6,647,735 | B2* | 11/2003 | Street | F25B 49/02 236/51 |
| 6,668,240 | B2* | 12/2003 | Singh | G05B 15/02 236/51 |
| 6,999,996 | B2* | 2/2006 | Sunderland | F25B 49/02 709/208 |
| 7,000,422 | B2* | 2/2006 | Street | F25B 49/02 236/51 |
| 8,959,036 | B2* | 2/2015 | Huat | G06Q 10/00 702/185 |
| 9,797,785 | B2* | 10/2017 | Giorgi | G01K 13/00 |
| 2007/0220907 | A1* | 9/2007 | Ehlers | F25B 49/005 62/126 |
| 2011/0106759 | A1* | 5/2011 | Brown, III | G06Q 10/06 707/622 |
| 2013/0289927 | A1* | 10/2013 | Smith | G06F 17/18 702/130 |
| 2015/0345821 | A1* | 12/2015 | Alsaleem | F24F 11/001 374/147 |

* cited by examiner

*Primary Examiner* — Michael C Zarroli

(57) ABSTRACT

A system and method for determining and reporting refrigeration equipment operating metrics using only sensed interior air temperature is taught. By repeatedly sensing interior air temperature an average food temperature metric, a runtime metric, a compressor cycle metric, and a door opening count metric is determined and reported.

23 Claims, 8 Drawing Sheets

FIELD DATA SENSOR AND METHOD OF REMOTE PERFORMANCE MONITORING

CROSS REFERENCE TO RELATED APPLICATIONS

This application claims benefit of U.S. Provisional Application No. 62/111,843 filed Feb. 4, 2015 and is a Continuation-In-Part of U.S. application Ser. No. 13/847,484 filed Mar. 20, 2013.

FIELD OF THE INVENTION

This invention relates generally to a field data capture system and in particular to a field data capture system primarily used in refrigeration equipment.

BACKGROUND OF THE INVENTION

The majority of companies and other organizations using refrigeration equipment do not collect environmental data on their equipment interiors. For those that do gather data such as interior air temperature, the data is usually not in human-actionable form, but rather it is merely presented as a chart or graph, usually basic in nature and not easily exportable.

Collecting refrigeration equipment environmental data is often cost-prohibitive. Conventional sensor systems for refrigeration equipment usually require a plurality of costly sensors. Conventional systems often utilize a different form of sensor for each metric gathered, for example, there is a separate sensor for obtaining door opening data, compressor cycles, and so forth.

Accordingly, there is still a continuing need for improved, simplified, cost-effective systems to provide data-gathering functionality without sacrificing accuracy. The present invention fulfills this need and further provides related advantages.

BRIEF SUMMARY OF THE INVENTION

A system and method for determining and reporting refrigeration equipment operating metrics using only a single sensed data type, for example, sensed interior air temperature is taught. By repeatedly sensing interior air temperature an average food temperature metric, a runtime metric, a compressor cycle metric, and a door opening count metric is determined and reported.

In a preferred embodiment the present invention provides a field data capture system comprising a sensor, firmware, a connector, a communications interface unit, a server, and machine-readable instructions. In a preferred embodiment the sensor gathers air temperature data. The sensor's firmware calculates metrics based on the sensor data. The metrics data is transmitted through the connector to the communications interface unit which forwards the metrics data to the server. The server comprises sub-processes and a database to process and convert the data into human-actionable formats, for example, graphs and charts, and provides user notification and maintenance alerts.

Notable human-actionable data includes, for example, performance factors such as operating cycles, power consumption, and average food temperature.

While the exemplar uses a temperature sensor, the system can be applied to other forms of sensors, for example, acoustic sensors, optical sensors, and pressure sensors.

In a preferred embodiment multiple metrics are calculated from gathered air temperature data. These metrics are there-after utilized to provide user notifications and data graphing/reports to warn of performance issues and for analytic purposes.

The margin of error in the present invention is found to be comparable to conventional, more complicated systems. The present invention also provides conversion of data into human-actionable formats such as spreadsheets, charts, and graphs.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

The accompanying drawings are included to provide a further understanding of the present invention. These drawings are incorporated in and constitute a part of this specification, illustrate one or more embodiments of the present invention, and together with the description, serve to explain the principles of the present invention.

Figure 1:
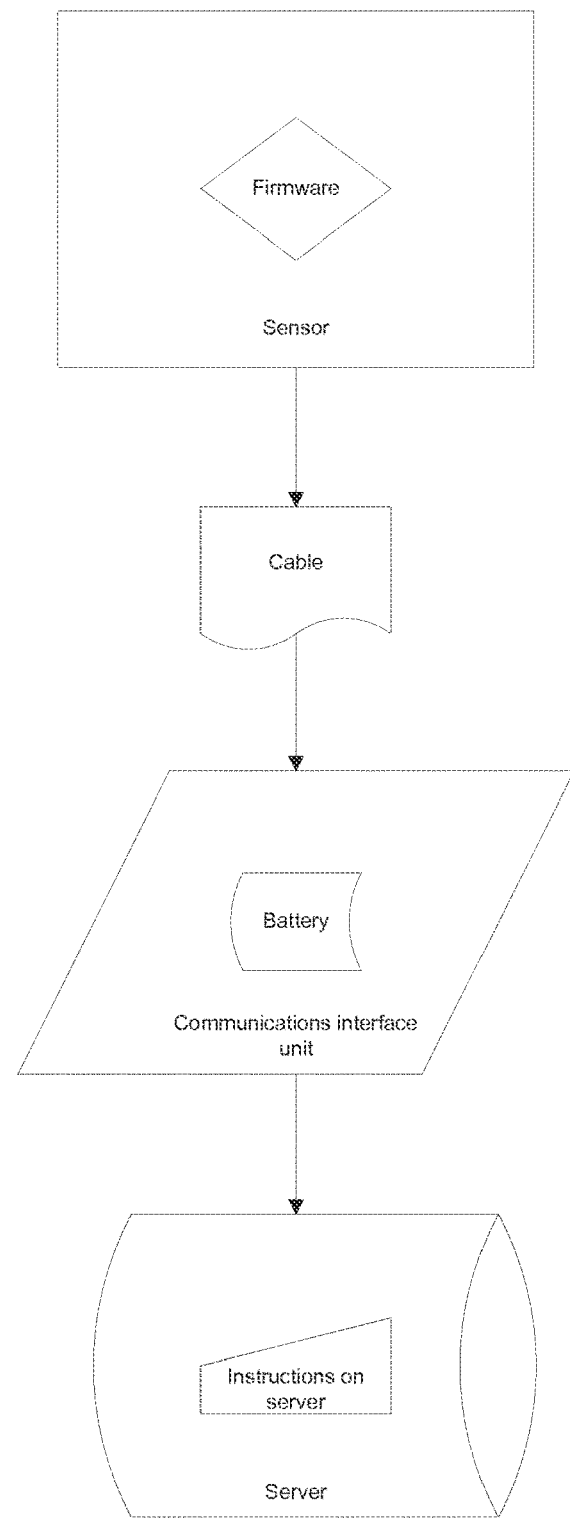
FIG. 1 is a flowchart overview of the system's major components and their interactions with each other.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

As required, detailed embodiments of the present invention are disclosed; however, it is to be understood that the disclosed embodiments are merely exemplary of the invention that may be embodied in various forms. The figures are not necessary to scale, and some features may be exaggerated to show details of particular components. Therefore, specific structural and functional details disclosed are not to be interpreted as limiting, but merely as a basis for the claims and as a representative basis for teaching one skilled in the art to variously employ the present invention. Where possible, like reference numerals have been used to refer to like parts in the several alternative embodiments of the present invention described herein.

The major components of the remote performance monitoring system include a sensor or sensors, sensor instructions, for example, firmware, preferably included as part of the sensor itself, a connector, for example, a cable, a communications interface unit, a power supply, for example, a battery pack, a server, and a set of server instructions, preferably included as part of the server. An overview is depicted in FIG. 1.

In a preferred embodiment there is a single sensor. Optionally a plurality of sensors placed at different locations in the detection area may be utilized. Preferably the sensor is an air temperature sensor, placed inside refrigeration equipment.

Figure 2:
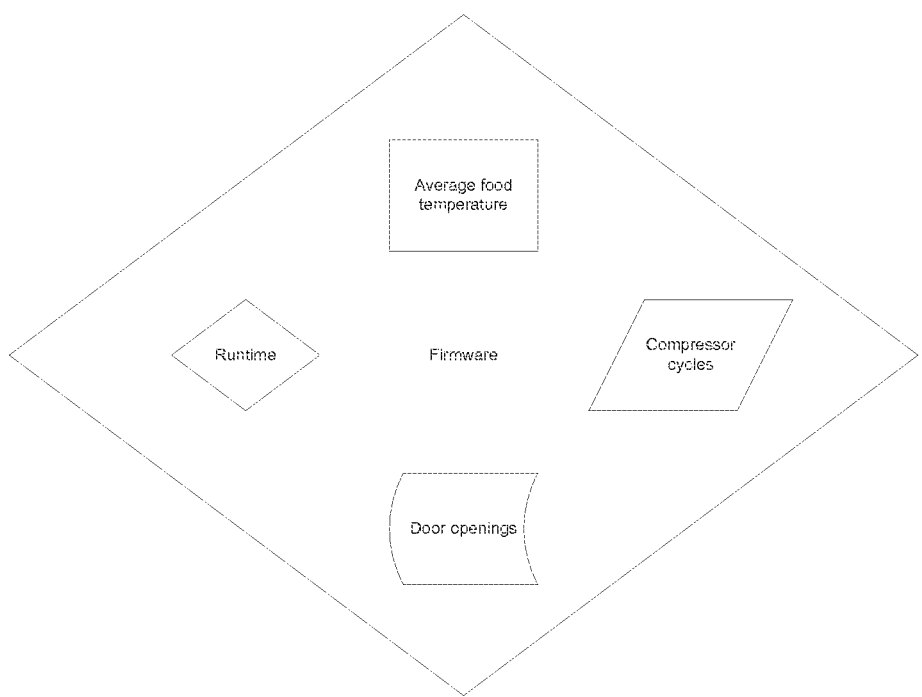
FIG. 2 is an overview of the firmware's sub-processes and their relationship with the overall firmware component.

The sensor instruction set (firmware) is preferably included as part of the sensor. In the preferred embodiment the firmware converts the air temperature into various performance metrics. Preferably a separate sub-process provides each performance metric. These sub-processes include, for example, but are not limited to: an average food temperature calculation sub-process, a runtime calculation sub-process, a compressor cycle calculation sub-process, and a door opening counter sub-process, depicted in FIG. 2. Following calculation of these metrics, the data is forwarded to the communications interface unit.

The sub-process for calculating the average food temperature outputs a moving average calculation on the air temperature. The sub-process mathematically determines the average food temperature for an average mass of food, given a specific air temperature. This sub-process comprises an algorithm based on specific heat of food materials and temperature differences over time. In the preferred embodiment, the calculation of average resulting food temperature is predicated on the fact that when an item, for example, an item of food, is placed inside a refrigeration equipment with a known inside temperature, the average resulting item temperature is then calculated based upon industry standard time and temperature equations, presently exemplified by, for example, NSF Standard P235, or other known time and temperature protocols for simulating the effect of a series of air temperature changes upon food.

Notably, this sub-process checks to see whether the refrigeration equipment chills the contents to acceptable food safety standards. This is determined by comparing the average air temperature with stipulated parameters. The sub-process outputs the determination as, for example, a Boolean value. In the preferred embodiment, the standard is NSF P235, instituted by the National Sanitation Foundation regulatory body, incorporated by reference. Optionally, the volume of the refrigeration equipment may be used to make the determination. The British Thermal Units Per Hour (BTUH) requirements to maintain food at a given temperature given a certain amount of refrigeration volume are known in the art.

TABLE A

| | | BTUH Load | | | | | | | | |
|---|---|---|---|---|---|---|---|---|---|---|
| | | +35 Room Usage | | +30 Room Usage | | 0 Room Usage | | −10 room Usage | | −20 Room Usage | |
| Dimension | Sq. Ft. | Avg. | Heavy | Avg. | Heavy | Avg. | Heavy | Avg. | Heavy | Avg. | Heavy |
| 6 × 6 × 8 | 36 | 4750 | 6389 | 4488 | 6037 | 4583 | 6505 | 4929 | 7041 | 5274 | 7577 |
| 6 × 8 × 8 | 48 | 5417 | 7274 | 5119 | 6974 | 5225 | 7407 | 5630 | 8028 | 6034 | 8648 |
| 6 × 10 × 8 | 60 | 6055 | 8100 | 5722 | 7655 | 5806 | 8213 | 6265 | 8911 | 6725 | 9609 |
| 8 × 8 × 8 | 64 | 6188 | 8291 | 5848 | 7835 | 5934 | 8410 | 6405 | 9127 | 6876 | 9844 |
| 8 × 10 × 8 | 80 | 6954 | 9269 | 6572 | 8759 | 6631 | 9363 | 7165 | 10169 | 7699 | 10974 |
| 8 × 12 × 8 | 96 | 7669 | 10174 | 7247 | 9614 | 7273 | 10234 | 7867 | 11123 | 8461 | 12011 |
| 8 × 14 × 8 | 112 | 8366 | 11045 | 7905 | 10437 | 7922 | 11092 | 8575 | 12059 | 9227 | 13026 |
| 8 × 16 × 8 | 128 | 9051 | 11888 | 8553 | 11234 | 8528 | 11890 | 9237 | 12933 | 9946 | 13976 |
| 8 × 18 × 8 | 144 | 9748 | 12732 | 9212 | 12032 | 9169 | 12732 | 9936 | 13852 | 10702 | 14972 |
| 8 × 20 × 8 | 160 | 10419 | 13548 | 9846 | 12803 | 9755 | 13490 | 10576 | 14682 | 11397 | 15874 |
| 8 × 22 × 8 | 176 | 11540 | 14807 | 10905 | 13992 | 10817 | 14715 | 11692 | 15977 | 12567 | 17239 |
| 8 × 24 × 8 | 192 | 12224 | 15622 | 11522 | 14763 | 11386 | 15439 | 12314 | 16769 | 13242 | 18099 |
| 8 × 26 × 8 | 208 | 12874 | 16398 | 12166 | 15496 | 11976 | 16176 | 12955 | 17573 | 13935 | 18970 |
| 8 × 28 × 8 | 224 | 13519 | 17163 | 12775 | 16219 | 12530 | 16873 | 13562 | 18336 | 14594 | 19799 |
| 8 × 30 × 8 | 240 | 14187 | 17947 | 13407 | 16960 | 13108 | 17587 | 14191 | 19115 | 15274 | 20642 |
| 8 × 32 × 8 | 256 | 14824 | 18694 | 14009 | 17666 | 13653 | 18264 | 14786 | 19855 | 15920 | 21446 |
| 10 × 10 × 8 | 100 | 7789 | 10339 | 7361 | 9770 | 7386 | 10401 | 7990 | 11304 | 8594 | 12208 |
| 10 × 12 × 8 | 120 | 8626 | 11385 | 8152 | 10759 | 8138 | 11405 | 8809 | 12401 | 9481 | 13397 |
| 10 × 14 × 8 | 140 | 9439 | 12384 | 8920 | 11703 | 8887 | 12405 | 9626 | 13493 | 10365 | 14581 |
| 10 × 16 × 8 | 160 | 10250 | 13379 | 9686 | 12643 | 9577 | 13311 | 10379 | 14484 | 11182 | 15658 |
| 10 × 18 × 8 | 180 | 11049 | 14349 | 10441 | 13560 | 10279 | 14216 | 11144 | 15472 | 12009 | 16728 |
| 10 × 20 × 8 | 200 | 11838 | 15299 | 11187 | 14458 | 10942 | 15070 | 11868 | 16405 | 12794 | 17741 |
| 10 × 24 × 8 | 240 | 13391 | 17180 | 12654 | 16207 | 12751 | 17231 | 13796 | 18721 | 14842 | 20211 |
| 10 × 28 × 8 | 280 | 14891 | 18922 | 14072 | 17881 | 14043 | 18844 | 15205 | 20482 | 16367 | 22120 |
| 12 × 12 × 8 | 144 | 10038 | 13021 | 9486 | 12305 | 8991 | 12553 | 9739 | 13655 | 10486 | 14756 |
| 12 × 14 × 8 | 168 | 10956 | 14155 | 10353 | 13376 | 10235 | 14052 | 11055 | 15251 | 11875 | 16450 |
| 12 × 16 × 8 | 192 | 11886 | 15284 | 11232 | 14443 | 11029 | 15082 | 11919 | 16375 | 12810 | 17667 |
| 12 × 18 × 8 | 216 | 12775 | 16359 | 12072 | 15459 | 11807 | 16080 | 12767 | 17464 | 13726 | 18847 |
| 12 × 20 × 8 | 240 | 13681 | 17440 | 12928 | 16481 | 12573 | 17052 | 13599 | 18524 | 14626 | 19995 |
| 12 × 22 × 8 | 264 | 14549 | 18474 | 13749 | 17458 | 13299 | 17974 | 14392 | 19541 | 15485 | 21088 |
| 14 × 14 × 8 | 196 | 11993 | 15423 | 11333 | 14575 | 11126 | 15216 | 12024 | 16521 | 12923 | 17826 |
| 14 × 16 × 8 | 224 | 13013 | 16656 | 12297 | 15740 | 11995 | 16338 | 12971 | 17745 | 13946 | 19152 |
| 14 × 20 × 8 | 280 | 15011 | 19042 | 14185 | 17795 | 13687 | 18487 | 14811 | 20088 | 15935 | 21688 |
| 14 × 24 × 8 | 336 | 16969 | 21347 | 16036 | 21073 | 15330 | 20539 | 16598 | 22324 | 17866 | 24110 |
| 16 × 16 × 8 | 256 | 14148 | 18019 | 13370 | 17028 | 12939 | 17550 | 13998 | 19067 | 15056 | 20583 |
| 16 × 20 × 8 | 320 | 16349 | 20631 | 15450 | 19496 | 14777 | 19873 | 15996 | 21598 | 17215 | 23323 |
| 16 × 24 × 8 | 374 | 18506 | 23157 | 17488 | 21883 | 16563 | 22093 | 17938 | 24017 | 19313 | 25941 |
| 18 × 18 × 8 | 324 | 16476 | 20782 | 15570 | 19639 | 14864 | 19989 | 16090 | 21724 | 17317 | 23460 |
| 18 × 20 × 8 | 360 | 18128 | 22644 | 17131 | 21398 | 16305 | 21678 | 17617 | 23523 | 18930 | 25369 |
| 18 × 24 × 8 | 432 | 20484 | 25389 | 19357 | 23993 | 18260 | 24090 | 19739 | 26149 | 21219 | 28208 |
| 20 × 20 × 8 | 400 | 19470 | 24145 | 18340 | 22817 | 17386 | 23019 | 18790 | 24982 | 20194 | 16945 |
| 20 × 24 × 8 | 480 | 21988 | 27132 | 20779 | 25640 | 19453 | 25566 | 21036 | 27755 | 22619 | 29945 |
| 20 × 28 × 8 | 560 | 24963 | 30480 | 23590 | 28804 | 21963 | 28514 | 23721 | 30922 | 25479 | 33330 |
| 20 × 32 × 8 | 640 | 27480 | 33340 | 25969 | 31506 | 23954 | 30909 | 25884 | 33529 | 27813 | 36149 |

TABLE A-continued

| | | BTUH Load | | | | | | | | | |
|---|---|---|---|---|---|---|---|---|---|---|---|
| | Floor | +35 Room Usage | | +30 Room Usage | | 0 Room Usage | | −10 room Usage | | −20 Room Usage | |
| Dimension | Sq. Ft. | Avg. | Heavy | Avg. | Heavy | Avg. | Heavy | Avg. | Heavy | Avg. | Heavy |
| 20 × 36 × 8 | 720 | 29946 | 36127 | 28299 | 34140 | 25919 | 33251 | 28017 | 36077 | 30115 | 38903 |
| 20 × 40 × 8 | 800 | 32420 | 38904 | 30637 | 36764 | 27888 | 35575 | 30153 | 38603 | 32518 | 41631 |
| 24 × 40 × 8 | 960 | 38694 | 45735 | 36565 | 46878 | 34681 | 43023 | 37368 | 46538 | 39939 | 49937 |
| 28 × 40 × 8 | 1120 | 43183 | 50733 | 40808 | 48970 | 38123 | 47062 | 41095 | 50921 | 43950 | 54664 |
| 32 × 40 × 8 | 1280 | 48550 | 56318 | 45880 | 55056 | 42894 | 51900 | 46146 | 56580 | 49282 | 60656 |
| 36 × 40 × 8 | 1440 | 54344 | 62804 | 51355 | 61626 | 46254 | 56259 | 49872 | 60781 | 53194 | 65186 |
| 40 × 40 × 8 | 1600 | 58738 | 67611 | 55507 | 66608 | 49583 | 60073 | 53385 | 64916 | 57070 | 69642 |

*Heavy usage is defined as two times the average air change. Average air changes determined by ASHRAE based on box size for 24 hour period.

Figure 3:
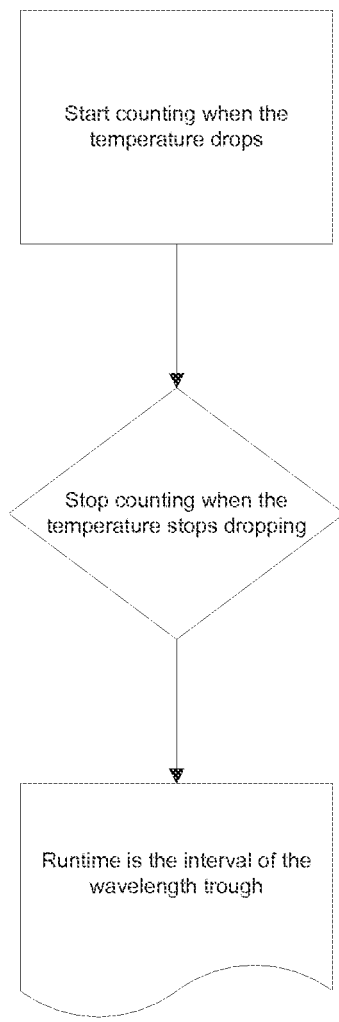
FIG. 3 depicts the runtime calculation sub-process.

The sub-process for calculating the refrigeration equipment runtime is depicted in FIG. 3. The runtime is the time interval between the commencement of a refrigeration equipment's interior temperature drop and when the interior temperature drop ends. When the interior temperature drops the refrigeration equipment's compressor is on. The sub-process determines the compressor cycles based upon the temperature drops.

The power consumption of the refrigeration equipment is mathematically determined by multiplying the runtime with the known kilowatt per hour rate of consumption. Preferably, this power consumption determination is performed later in the usage process at the server level, discussed below.

Optionally, this sub-process performs the power consumption calculation during this firmware sub-process's execution and not at the server level. The firmware then forwards the calculated consumption rate to the communications interface unit and eventually to the server, along with the runtime data. In this instance the server receives the power consumption information rather than calculating it itself.

The firmware sub-process for calculating the number of compressor cycles utilizes the same input data as the runtime calculation sub-process. If the refrigeration equipment inside temperature drops, the compressor is on. By performing a wavelength analysis and counting the peaks and troughs of temperature changes the sub-process calculates the number of cycles. The wavelength geometry is stored and subsequently forwarded to the communications interface and thereafter to the server. The wavelength geometry is a distinctive feature of each refrigeration equipment, generally comparable to an identifying fingerprint.

As discussed above, a cycle is the interval between the commencement of temperature drop and when it stops dropping. This represents a single runtime of the compressor.

The firmware sub-process for calculating the number of door openings of the refrigeration equipment counts temperature spikes. A temperature spike is a breach of the integrity of the interior area of the refrigeration equipment. This sub-process tallies the number of temperature spikes to count the number of door openings.

If the refrigeration equipment compressor turns off the interior temperature will rise. However, when the door opens, the interior temperature will rise more quickly than if the compressor had simply turned off and the door remained closed. If the rate of interior temperature increase is faster than that of the compressor's known off-cycle interior temperature increase, the event will be flagged as a door opening. In this manner the sub-process will tally the number of door openings. As with other performance metrics the tally will be sent to the communications interface unit and then to the server.

The connector, for example, a cable, transmits firmware generated data between the sensor and the communications interface unit. The connector is preferably located between the sensor and the communications interface unit. The connector may be, for example, a Universal Serial Bus (USB), Ethernet cable or other known cable. Non-cabled (wireless) connection is also contemplated.

The communications interface unit is preferably self-contained, and acts as an intermediary between the sensor and the server. The sensor is connected to the communications interface unit via the aforementioned connector. The communications interface unit forwards data from the sensor to the server. Optionally, the communications interface unit may use non-cable connectors to communicate with the sensor and/or server, for example, WiFi or general packet radio service (GPRS).

The power source for the communications interface, for example, a battery pack, is preferably part of the communications interface unit.

A server comprising a storage medium is provided. Alternatively, remotely located storage may be used, for example, cloud storage.

A server instruction set comprised of multiple subcomponents and sub-processes, for example, a graph/report creation sub-process, a database creation sub-process, a sub-process for calculation of power consumption, user notification sub-processes, different user interface views based on user permissions, and maintenance alerts and calculations are included.

The server instruction set graph/report creation sub-process converts the data metrics relayed by the communications interface unit into human-readable graphs and reports. It also graphs and creates reports on data calculated at the server, for example, power consumption data. Optionally, a data export sub-process exports graphs and reports into industry-standard format, for example, known spreadsheet format.

The server instruction set database subcomponent formats and stores the data on the server.

Figure 4:
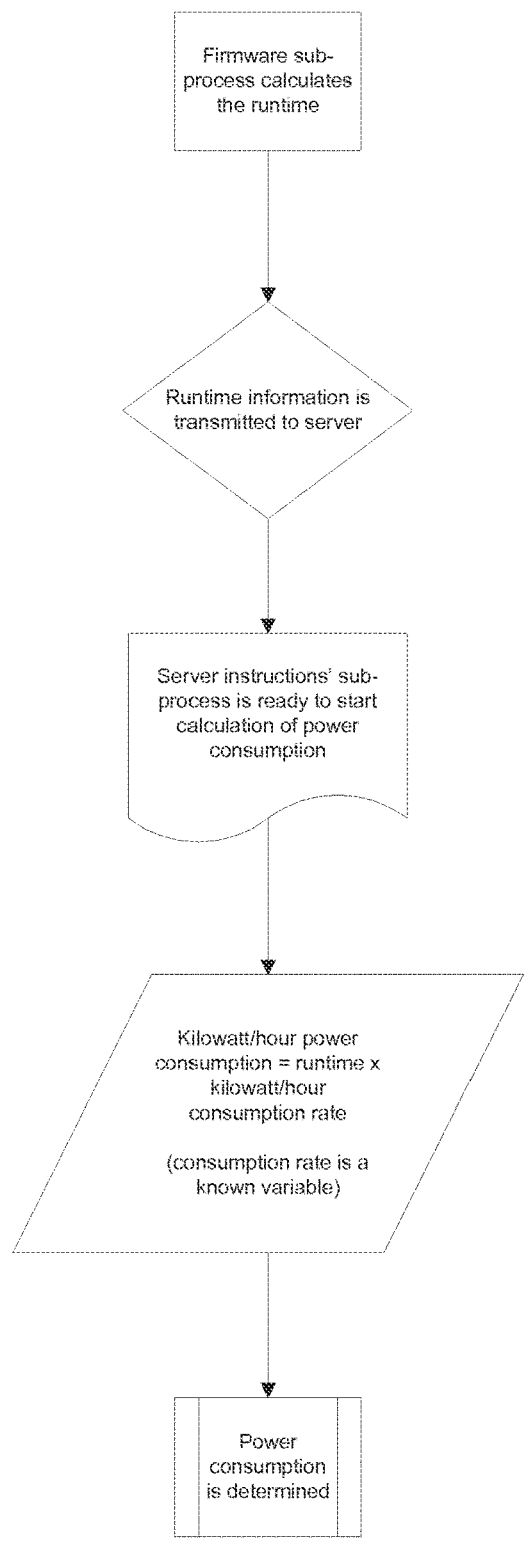
FIG. 4 depicts the power consumption calculation sub-process.

The server instruction set calculation of power consumption subcomponent/sub-process is depicted in FIG. 4. This sub-process mathematically determines to a predetermined degree of accuracy the power consumption of the refrigeration equipment expressed in standard units, for example, kilowatts. As discussed earlier, the runtime is transmitted to the server via the communications interface unit. The power consumption is thereafter calculated by multiplying the runtime by the known kilowatt/hour rate of consumption. The power consumption data can also be converted into a chart or graph via the aforementioned graph/report creation sub-process.

The server instruction set user notification sub-processes provides notice of predetermined events, for example, predetermined non-standard conditions. For example, when a temperature spike is determined, the sub-process will send a notification, for example, an SMS message, an automated call, or other forms of contact to appropriate personnel to address the non-standard condition.

Figure 5:
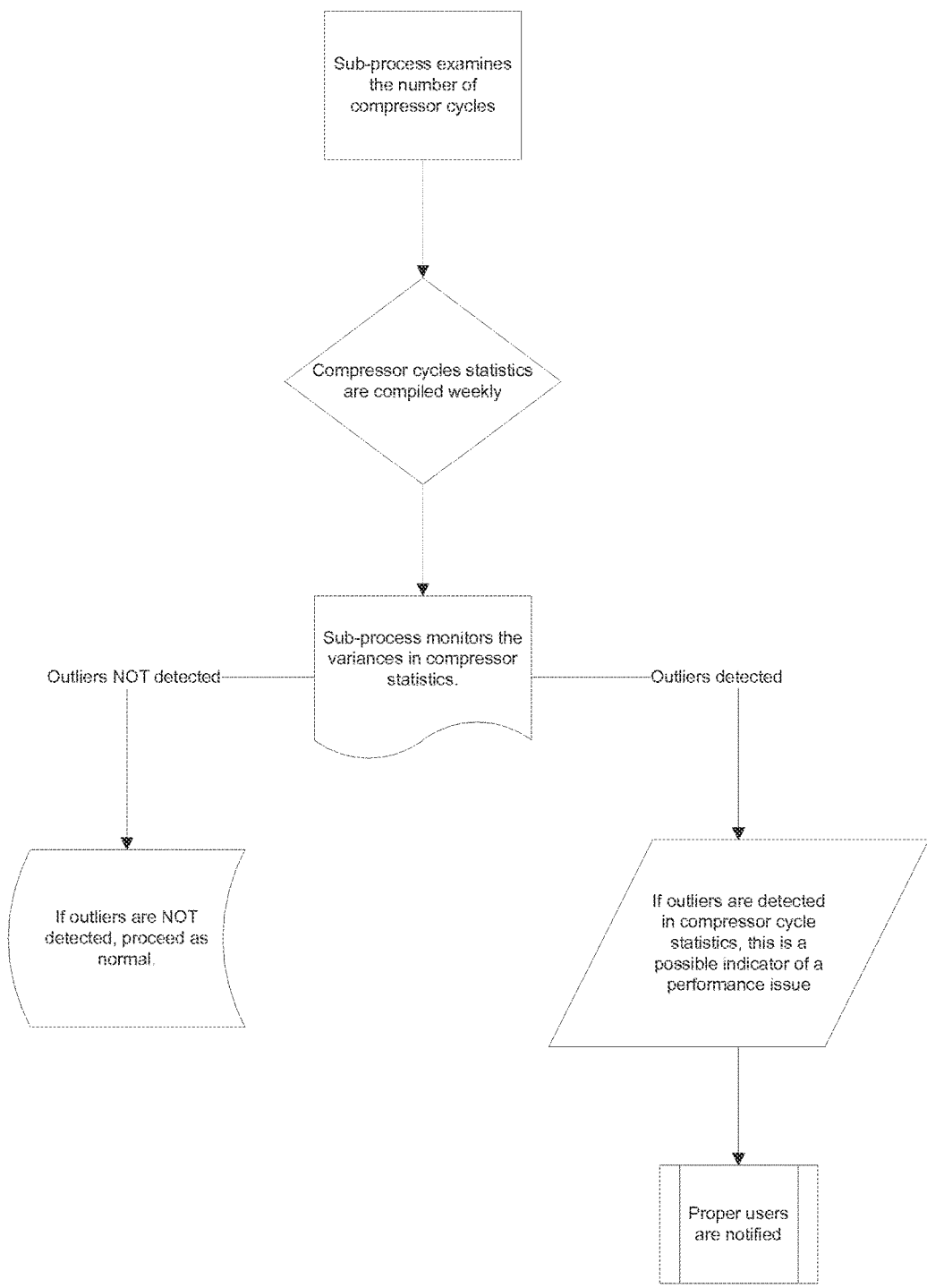
FIG. 5 depicts the maintenance alert sub-process with compressor issues as an example.

The server instruction set user notification sub-process for routine maintenance alerts and calculations is depicted in FIG. 5. Optionally, this sub-process is a separate alert system for routine maintenance tasks from that of the non-standard alert system described earlier.

In this routine maintenance user notification sub-process calculations on data metrics are performed to determine maintenance needs. For example, the sub-process examines the number of weekly compressor cycles. If the number of cycles unexpectedly changes from a known usage pattern the sub-process registers this event as an indicator of a possible performance issue. As another example, sub-process wavelength analysis against known standard wavelength geometry will determine early compressor non-standard conditions. Both events result in generation of a notice to appropriate personnel.

A server instruction set sub-process provides predetermined user interface views based upon preset user permissions. For example, users are presented with information and options pertinent to their job description. For example, a marketing executive will see graphs and reports relating to usage data. By contrast, maintenance personnel are presented with data relating to performance.

Figure 6:
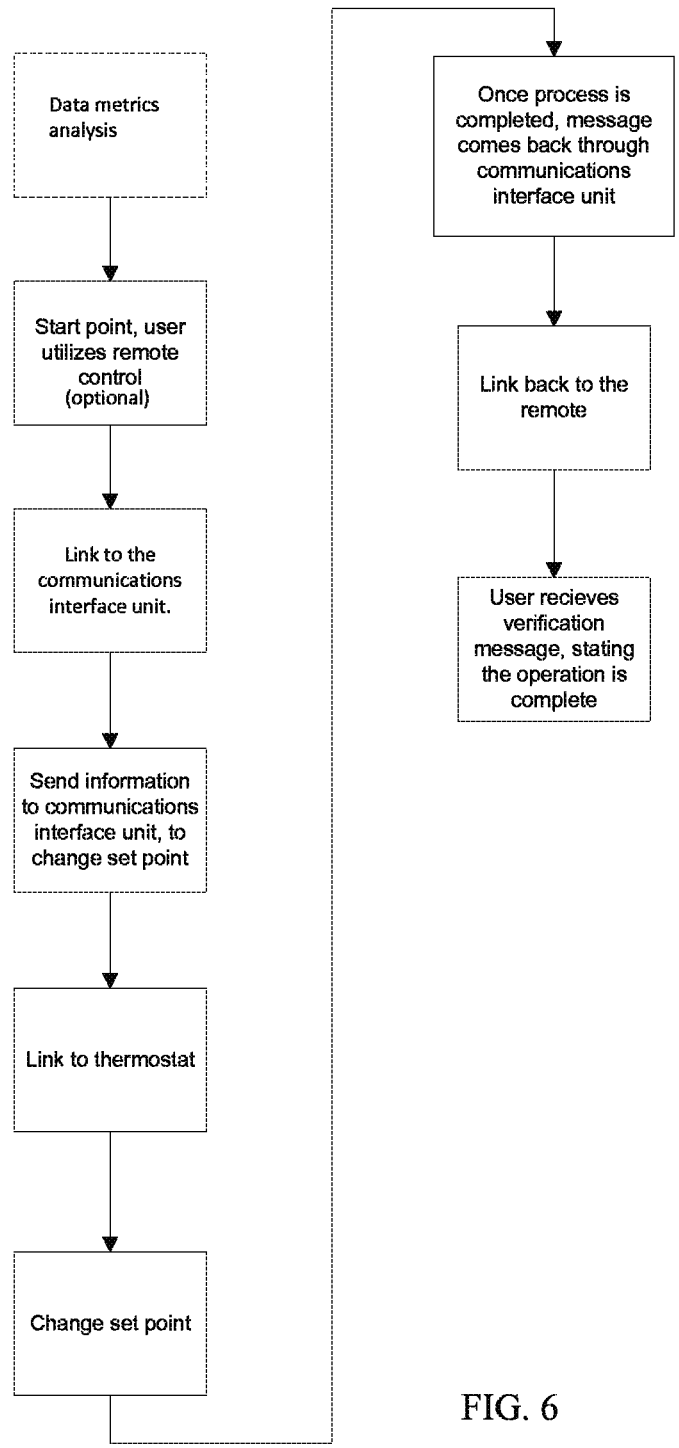
FIG. 6 depicts the process of utilizing the remote control to set the point of the thermostat.

Optionally, after analysis of the gathered data metrics the refrigeration equipment is remotely controlled. For example, a user may remotely control the refrigeration equipment or a sub-process may automatically remotely control the refrigeration equipment, based upon the analyzed data metrics. For example, the refrigeration equipment door may be remotely closed, the temperature set point may be remotely set, the compressor may be turned off or on, and/or the compressor runtime may be altered. FIG. 6 depicts an exemplar remote control of the refrigeration set point.

The interaction of the components and usage in a preferred embodiment is as follows:

The sensor is installed into the interior of the refrigeration equipment. The firmware is optionally pre-loaded as part of the sensor. The sensor monitors and identifies the air temperature. The firmware converts the air temperature into various performance metrics such as the average food temperature, runtime, compressor cycles, and number of door openings. These metrics are transmitted through the connector to the powered communications interface unit. The communications interface unit then transmits the metrics data from the sensor's firmware to the server.

The instruction set on the server processes the metrics data. Graphs and reports are created in a human-readable format. The database stores the data. Power consumption data is calculated based upon the received metrics data. Notifications and maintenance alerts are generated upon predetermined refrigeration equipment functionality conditions. Predetermined user interface views are presented, dependent upon predetermined user criteria.

Optionally, upon either direct user input using an input device, for example a remote control device, touchpad, keyboard or keypad; or automatic sub-process input, the refrigeration equipment is remotely controlled. Input is sent to the communications interface unit and transmitted to the refrigeration equipment. For example, upon user or sub-process review of temperature metrics, temperature control information is transmitted to the communications interface unit. The communications interface unit transmits the information to the refrigeration equipment thermostat which thereupon changes the set point. Optionally, a verifications message is transmitted back through the communications interface unit, and, if appropriate, to the remote control input device, confirming that the operation has completed successfully.

The sensor of a preferred embodiment is depicted in FIGS. 6-9.

Figure 7:
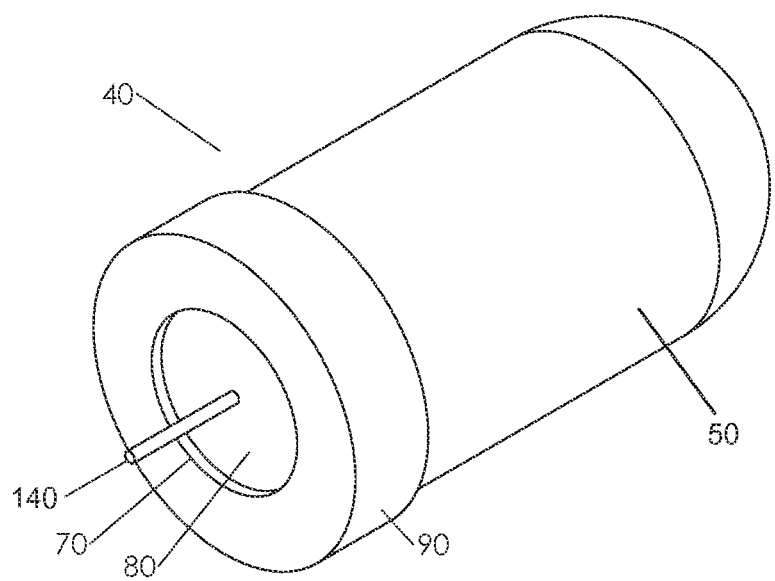
FIG. 7 is a perspective view of a sensor casing.
Figure 8:
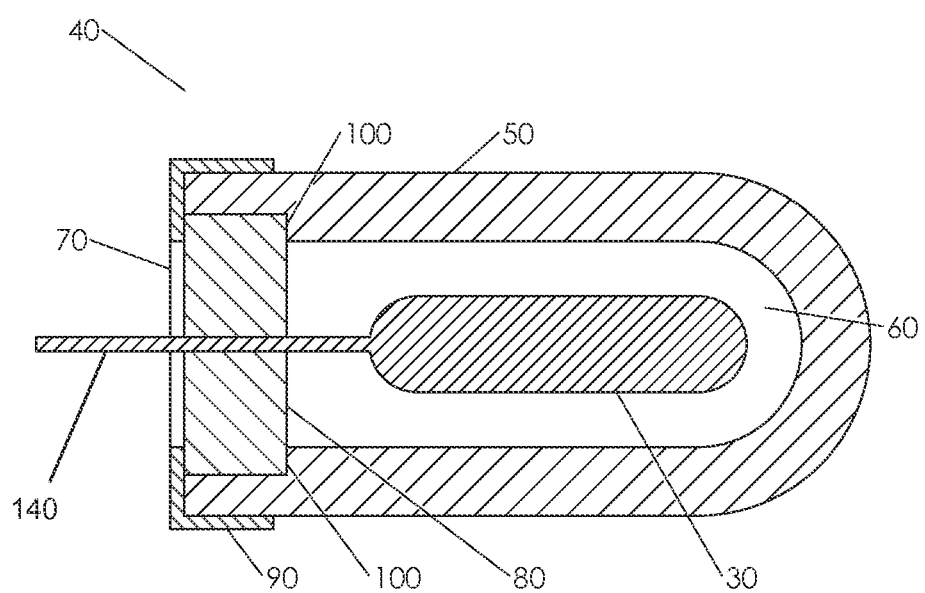
FIG. 8 is a side view of the casing.

Referring now to FIGS. 7 and 8, casing 40 comprises a casing entrance 70, a casing wall 50, a casing seal 80, a casing cap 90 and a casing chamber 60. In one embodiment, the casing seal 80 is seated against a casing seat 100 to prevent the casing seal 80 from being pushed into the casing chamber 60 during insertion of the thermal sensor 30. Likewise, the casing cap 90 may also be designed to prevent the casing seal 80 from being dislodged during extraction of the thermal sensor 30.

Casing wall 50 may have an approximately cylindrical shape with one open end and one closed end (which may be rounded), although it is not limited to this shape, and could instead having any other shape, such as an extruded square, rectangle, oval, etc. The casing wall 50 may be shaped and configured to receive and accommodate the thermal sensor 30 inside casing chamber 60. The casing wall 50 may have a thickness of between about 1 mm and about 15 mm, which may or may not be substantially uniform. For instance, the casing wall 50 may have a thickness near the casing entrance 70 that is greater or less than a thickness opposite the casing entrance 70. In one embodiment, the casing 40 is configured such that the thermal sensor 30 is substantially not in contact with the casing wall 50.

The casing seal 80 may be made from any number of compressible materials designed to accommodate a thermal sensor 30 and substantially prevent airflow into the casing chamber 60 by creating a seal around the thermal sensor connection 140. In one embodiment, the casing seal 80 is made of closed-cell silicone foam with a central aperture to allow insertion of the thermal sensor 30. In another embodiment, the casing seal 80 is stretchable so that the casing seal 80 is configured to receive a first thermal sensor 30 of a first diameter at a first time and a second thermal sensor 30 of a second diameter different than the first diameter at a second time, without losing its ability to prevent substantially all air flow from passing through the aperture of the casing seal 80.

Casing seat 100 may comprise a groove or cut-out in the casing wall 50 that has a dimension larger than an inside dimension of the casing wall 50 and a dimension smaller than an outside dimension of the casing wall 50, so that a thickness of material surrounding the casing seat 100 is less than a thickness of the casing wall 50, such as between about 0.5 mm and about 7 mm. Casing seat 100 has an inside dimension about equal to an outside dimension of casing seal 80, discussed as follows, so that casing seal 80 can rest inside and seal off the casing chamber 60 without being able to slide beyond casing seat 100. In one embodiment, the casing seal 80 may be configured to have a slightly larger dimension which may create a more effective seal against the thermal sensor connection 140.

The casing wall 50 may comprise any rigid solid that can contain the thermal sensor 30 as well as conduct heat to and from the casing chamber 60, for example, plastic, metal, ceramics, and composite materials. The casing wall 50 transfers heat sufficiently slowly such that the air inside casing chamber 60 has a temperature representing a moving average of the temperature in the substance or environment whose temperature is being probed. In other words, the casing wall 50 may damp sharp fluctuations in the environmental temperature, so that the control apparatus 20 does not over-react to changes in the environmental temperature. One aspect includes, for example, providing different materials, dimensions, and wall thicknesses of casing wall 50 so as to achieve the desired response time between environmental temperature and temperature sensed by the thermal sensor 30.

In one embodiment, the casing wall 50 is configured to allow the air inside the casing chamber 60 to substantially mimic product temperature. The casing wall 50 may be made from a number of materials, but preferably an impact-resistant plastic that is configured to be safe for use near food.

The casing chamber 60 and casing entrance 70 may be of any diameter and length configured to allow a thermal sensor 30 to be housed in the casing chamber 60, for example, about 5 mm in diameter and about 60 mm in length to accommodate a digital thermal sensor 30, and about 10 mm in diameter and about 90 mm in length to accommodate a mechanical thermal sensor 30. In one embodiment, the casing wall 50 and casing seal 80 may be configured to create a substantially uniform thermal barrier around the thermal sensor 30, which ensures that the air temperature inside the casing chamber 60 is not asymmetrically influenced by the ambient temperature.

Figure 9:
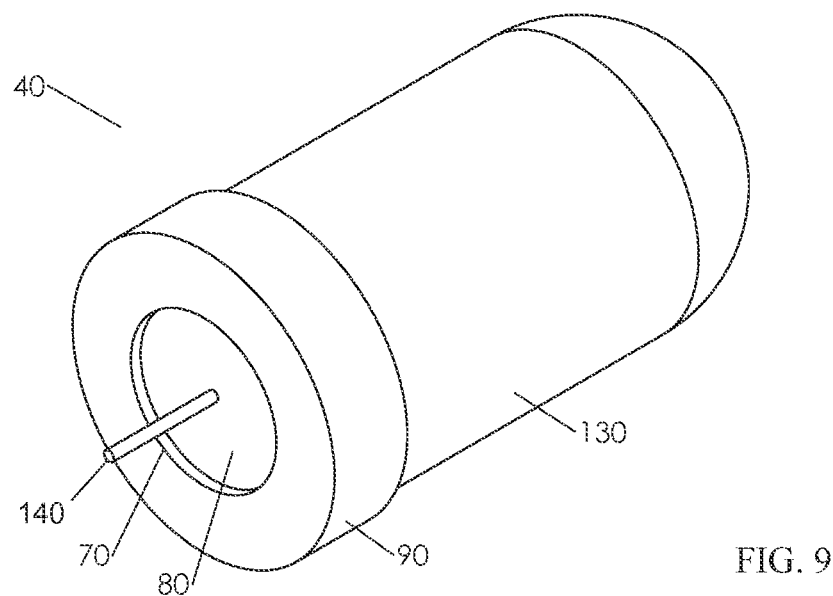
FIG. 9 is a perspective view of a casing.
Figure 10:
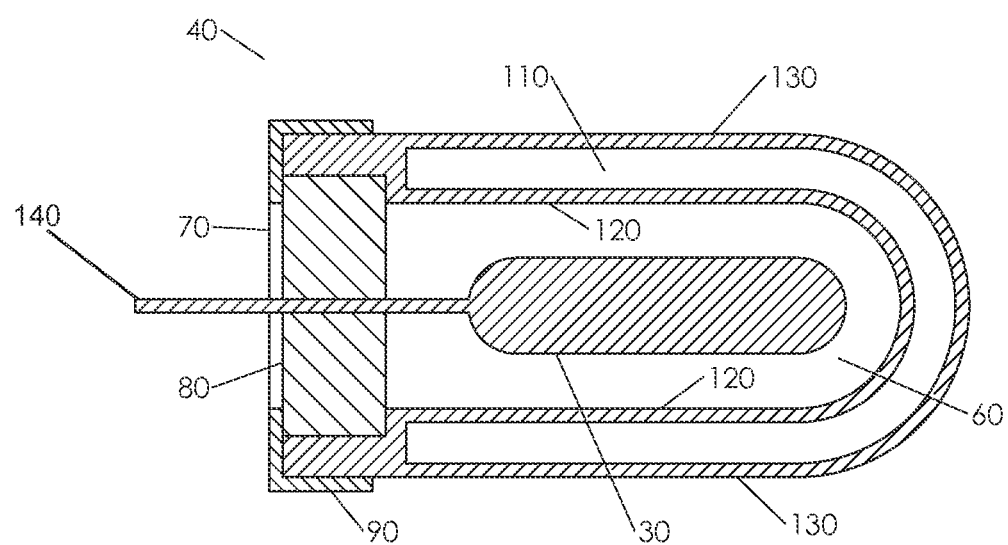
FIG. 10 is a side view of a casing.

Referring now to FIGS. 9 and 10, casing 40 comprises a casing entrance 70, an inner casing wall 120, an outer casing wall 130, a casing seal 80, a casing cap 90, a casing chamber 60, and a fluid chamber 110. Fluid chamber 110 is configured to hold a variety of fluids, for example, air, which may be configured to simulate or substantially match a temperature of a product whose temperature aims to be sensed by the thermal sensor 30.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A remote monitoring system comprising
a sensor;
sensor instructions;
a connector connecting the sensor to a communications interface unit;
a power supply;
a server; and
a set of server instructions;
wherein
the sensor instructions comprises at least one of an average food temperature calculation sub-process, a runtime calculation sub-process, a compressor cycle calculation sub-process, and a door opening counter sub-process; a respective sub-process used to provide an average food temperature metric, a runtime metric, a compressor cycle metric, and a door opening count metric;
the sensor instructions converts sensor collected data into performance metrics thereafter forwarded to the communication interface unit;
the set of server instructions converts the performance metrics into human readable form;
the sensor contributes to a final metric display; and
the sensor comprises:
a casing wall enclosing a casing chamber that is closed at one end;
a casing fluid chamber within the casing wall;
a casing entrance at another end of the casing chamber;
a casing cap connected to the casing wall at the casing entrance; and
a casing seal connected between the casing cap and the casing wall at the casing entrance, the casing seal comprising a compressible material and an aperture passing through the compressible material;
wherein the aperture retains an ability to remove and reinsert a thermal sensor and substantially prevent air in-flow with the thermal sensor inserted.

2. The remote monitoring system of claim 1 wherein the casing fluid chamber contains a fluid.

3. The remote monitoring system of claim 1 further comprising a thermal sensor located inside the casing chamber and connected to a thermal sensor connection passing through the aperture.

4. The remote monitoring system of claim 1 further comprising a casing seat wherein the casing seal is seated in the casing seat.

5. The remote monitoring system of claim 1 wherein the thermal sensor is not in contact with the casing wall.

6. The remote monitoring system of claim 1 wherein the thermal sensor is surrounded by a substantially uniform thermal barrier.

7. The remote monitoring system of claim 1 further comprising a casing cap configured to prevent the casing seal from becoming dislodged.

8. The remote monitoring system of claim 1 wherein the casing seal substantially prevents air from flowing into the chamber.

9. A remote monitoring system comprising
an air temperature sensor;
a sensor instruction set;
a connector connecting the air temperature sensor to a communications interface unit;
a power supply;
a server; and
a set of server instructions;
wherein
the sensor instruction set comprises at least one of an average food temperature calculation sub-process, a runtime calculation sub-process, a compressor cycle calculation sub-process, and a door opening counter sub-process; a respective sub-process used to provide an average food temperature metric, a runtime metric, a compressor cycle metric, and a door opening count metric;
the sensor instruction set converts collected air temperature data into performance metrics thereafter forwarded to the communication interface unit;
the set of server instructions converts the performance metrics into human readable form; and
the sensor contributes to a final metric display.

10. The remote monitoring system of claim 9 wherein the human readable form comprises at least one of an average food temperature, a runtime, a compressor cycle, and a door opening count.

11. The remote monitoring system of claim 9 wherein the sensor instruction set comprises an average food temperature calculation sub-process, a runtime calculation sub-process, a compressor cycle calculation sub-process, and a door opening counter sub-process; a respective sub-process used to provide an average food temperature metric, a runtime metric, a compressor cycle metric, and a door opening count metric.

12. The remote monitoring system of claim 9 wherein the set of server instructions comprises at least one of a graph creation sub-process, a report creation sub-process, a database creation sub-process, a power consumption calculation sub-process, a user notification sub-process, and an alert sub-process; a respective sub-process used to provide a graph, a report, a database, a power consumption calculation, a user notification and an alert.

13. The remote monitoring system of claim 9 wherein the set of server instructions comprises a graph creation sub-process, a report creation sub-process, a database creation sub-process, a power consumption calculation sub-process, a user notification sub-process, and an alert sub-process; a respective sub-process used to provide a graph, a report, a database, a power consumption calculation, a user notification and an alert.

14. The remote monitoring system of claim 13 wherein different user interface views are generated based upon predetermined user permissions.

15. The remote monitoring system of claim 9 further comprising a remote control input device.

16. A method for providing refrigeration equipment operating metrics from sensing only interior air temperature comprising the steps of:
providing a power supply;
placing an air temperature sensor within the interior of the refrigeration equipment;
connecting the sensor to a communications interface unit;
connecting the communications interface unit to a server;
repeatedly sensing refrigeration equipment interior temperature; and
forwarding metrics to the communication interface unit; wherein
an instruction set converts collected air temperature data into performance metrics;
a set of server instructions converts the performance metrics into human readable form;
the sensor contributes to a final metric display; and
the instruction set comprises a sensor instruction set comprising at least one of an average food temperature calculation sub-process, a runtime calculation sub-process, a compressor cycle calculation sub-process, and a door opening counter sub-process; a respective sub-process used to provide an average food temperature metric, a runtime metric, a compressor cycle metric, and a door opening count metric.

17. The method of claim 16 wherein the human readable form comprises an average food temperature, a runtime, a compressor cycle, and a door opening count.

18. The method of claim 16 wherein the sensor comprises:
a casing wall enclosing a casing chamber that is closed at one end;
a casing fluid chamber within the casing wall;
a casing entrance at another end of the casing chamber;
a casing cap connected to the casing wall at the casing entrance; and
a casing seal connected between the casing cap and the casing wall at the casing entrance, the casing seal comprising a compressible material and an aperture passing through the compressible material;
wherein the aperture retains an ability to remove and reinsert a thermal sensor and substantially prevent air in-flow with the thermal sensor inserted.

19. The method of claim 16 wherein the instruction set comprises a sensor instruction set comprising an average food temperature calculation sub-process, a runtime calculation sub-process, a compressor cycle calculation sub-process, and a door opening counter sub-process; a respective sub-process used to provide an average food temperature metric, a runtime metric, a compressor cycle metric, and a door opening count metric.

20. The method of claim 16 wherein the set of server instructions comprises at least one of a graph creation sub-process, a report creation sub-process, a database creation sub-process, a power consumption calculation sub-process, a user notification sub-process, and an alert sub-process; a respective sub-process used to provide a graph, a report, a database, a power consumption calculation, a user notification and an alert.

21. The method of claim 16 wherein the set of server instructions comprises a graph creation sub-process, a report creation sub-process, a database creation sub-process, a power consumption calculation sub-process, a user notification sub-process, and an alert sub-process; a respective sub-process used to provide a graph, a report, a database, a power consumption calculation, a user notification and an alert.

22. The method of claim 16 further comprising the steps of analyzing the operating metrics; and remotely controlling the refrigeration equipment based upon the analysis.

23. A method for providing refrigeration equipment operating metrics from sensing only interior air temperature comprising the steps of:
providing a power supply;
placing an air temperature sensor within the interior of the refrigeration equipment;
connecting the sensor to a communications interface unit;
connecting the communications interface unit to a server;
repeatedly sensing refrigeration equipment interior temperature; and
forwarding metrics to the communication interface unit; wherein
an instruction set converts collected air temperature data into performance metrics;
a set of server instructions converts the performance metrics into human readable form;
the sensor contributes to a final metric display; and
the sensor comprises:
a casing wall enclosing a casing chamber that is closed at one end;
a casing fluid chamber within the casing wall;
a casing entrance at another end of the casing chamber;
a casing cap connected to the casing wall at the casing entrance; and
a casing seal connected between the casing cap and the casing wall at the casing entrance, the casing seal comprising a compressible material and an aperture passing through the compressible material;
wherein the aperture retains an ability to remove and reinsert a thermal sensor and substantially prevent air in-flow with the thermal sensor inserted.

* * * * *